United States Patent [19]

Pignotti

[11] Patent Number: 5,168,607
[45] Date of Patent: Dec. 8, 1992

[54] SNAP CLOSURE DEVICE

[76] Inventor: Sandro Pignotti, Via Delle Fonti, 8/C Bussana Sanremo, Italy

[21] Appl. No.: 565,340

[22] Filed: Aug. 10, 1990

[30] Foreign Application Priority Data

Aug. 23, 1989 [IT] Italy ............................. 16306 A/89

[51] Int. Cl.$^5$ ............................................. A44B 13/00
[52] U.S. Cl. .............................................. 24/599.9
[58] Field of Search ........................... 24/599.9, 599.5

[56] References Cited

U.S. PATENT DOCUMENTS

| 316,269 | 4/1885 | Jewett | 24/599.9 |
| 1,352,982 | 9/1920 | Luthi | |
| 1,402,868 | 1/1922 | King | 24/599.9 X |
| 1,826,887 | 10/1931 | Kestenman | 24/599.9 |
| 2,283,328 | 5/1942 | Goodwin | 24/599.9 |

FOREIGN PATENT DOCUMENTS

| 403448 | 11/1909 | France. | |
| 2056481 | 5/1971 | France. | |
| 7200 | of 1913 | United Kingdom | 24/599.9 |

Primary Examiner—James R. Brittain
Attorney, Agent, or Firm—Jacobson, Price, Holman & Stern

[57] ABSTRACT

A snap closure device, in particular for jewellery, costume jewellery trinkets and the like, comprising a body with a hook part open on one side and a closing member hinged onto the body. The closing member has a closure part for closing the hook, a part for resiliently engaging on the body and an operating part, and it is movable between an open position, in which the hook part is open towards the outside, and a snap closed position, in which the closing member engages the body and closes the hook.

4 Claims, 1 Drawing Sheet

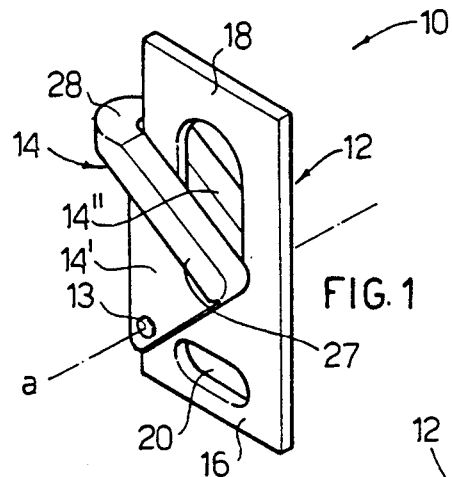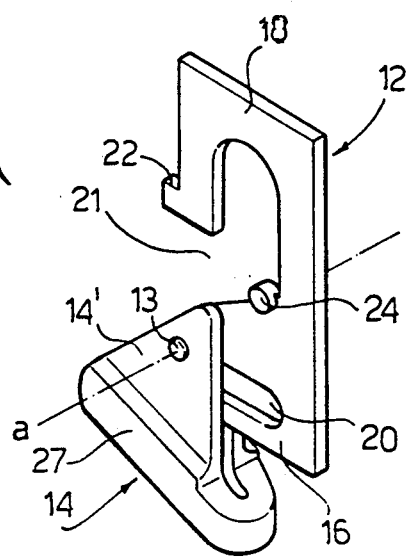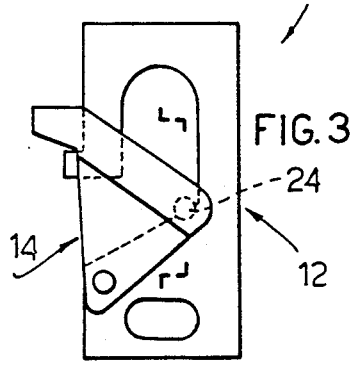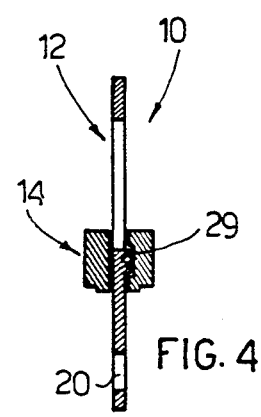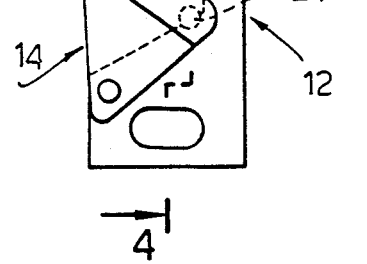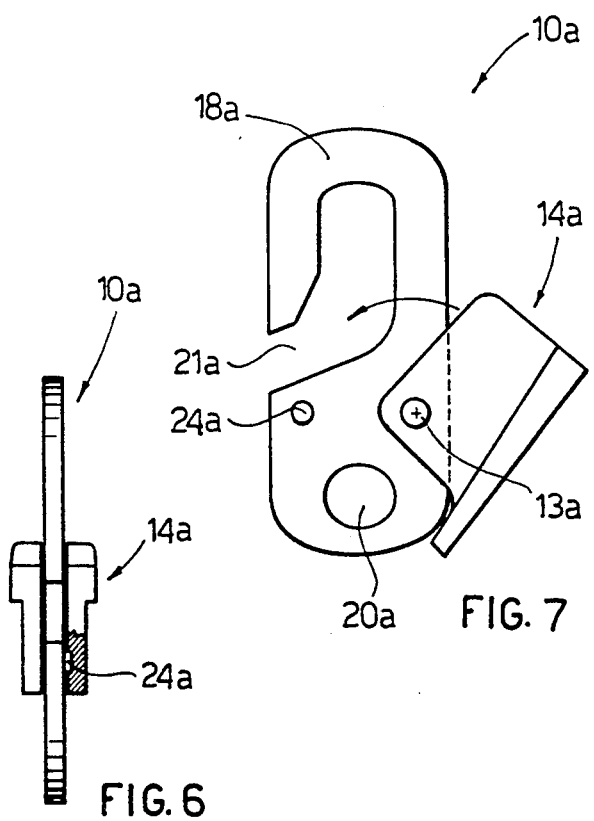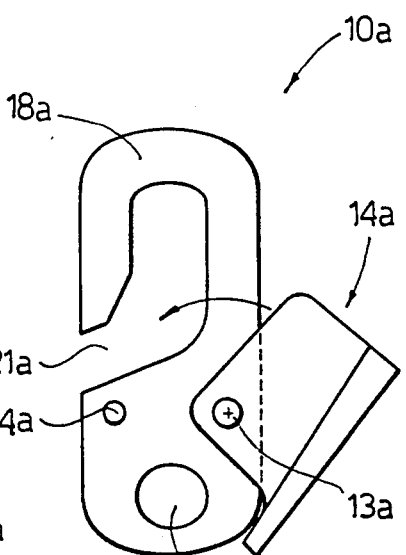

SNAP CLOSURE DEVICE

The present invention relates to the field of closure devices with particular but not exclusive reference to the costume jewelry and jewelry fields and the like.

At present various types of closure devices are used for fastening chains, necklaces and the like; one known closure device comprises a so-called "spring catch", having a hook which is opened and closed by means of a sliding pin which is spring urged into a closed position and held back manually in an open position against the action of the spring.

The construction of such known devices involves problems, with consequently high production costs; the devices jam easily and have a relatively limited life mainly owing to the unpredictable life of the spring.

The aim of this invention is to realize a clasp for chains, necklaces and the like which is easy to produce, reliable, has a predictable life span and can be realized easily in different forms to suit different aesthetic requirements.

These aims have been achieved with the device according to this invention, which comprises a body with a hook part open on one side, a closing element or member hinged to the body, the closing element having a closing part and being able to revolve around the pin between a position which leaves the opening of the hook free and a position in which the closing part obstructs the opening of the hook.

The new device is easy to construct and assemble and can be realized in different forms suitable for different styles. It does not jam, does not open accidentally and the length of its useful life can be estimated.

The device is described below in greater detail with reference to the appended drawings, illustrating embodiments which are merely exemplary and not restrictive, in which:

FIG. 1 is a perspective view of a first embodiment of the closure device, in a closed condition;

FIG. 2 is a perspective view of the device, similar to FIG. 1, but shown in an open condition;

FIG. 3 is a side view of the device;

FIG. 4 is a section along 4—4 of FIG. 3;

FIG. 5 is a side view of a second embodiment of the device, in the closed condition;

FIG. 6 is a view from the right side of FIG. 5;

FIG. 7 is a view of the device in FIG. 5 from the other side, in the open condition.

The device which is the object of the invention is referenced as a whole by number 10 in the figures and comprises a body 12 and a closing member 14.

The body 12 comprises an anchorage part 16 and hook part 18. The anchorage part generally comprises an anchorage slot 20 for the link of a chain; it could however have any other form whatsoever onto which the end of a chain, necklace, ring or the like could be welded or fixed in some other way.

The hook part 18 is usually U-shaped or in the form of an open eyelet, with one side ot the U forming an opening 21 and preferably with a tooth 22 protruding slightly towards the outside from the free arm of the U.

On the body 12 the closing member 14 is pivoted at 13 in such a way as to be pivotable around an axis a which is substantially orthogonal to the plane containing the hook 18.

On the body 12 a means 24, like a projection or a recess is also provided, for snap locking of the closing member; there could be two of these means, one on each face of the body.

Essentially the member 14 comprises a part which closes the opening 21 of the hook and a part which engages the snap locking means 24. The member 14 essentially has a double walled structure, extending along each face of the body 12, the parts being connected by at least one U-shaped portion.

In the example in FIGS. 1 to 4, the member 14 comprises two plates 14', 14" which have thicker portions 27, in which is/are provided the cavity/cavities 29 for snap engaging the projection/s 24. The parts 27 are joined by a connection portion 28. When the device is closed, the portions 27 assume a position transverse to the hook 18 and preferably oblique with respect to the longitudinal axis of the device.

It should be noted that preferably the fulcrum 13 is more or less on the theoretical extension of one side of the hook and the projection 24 on the theoretical extension of the other side of the hook, while the connection part 28 of the U in its closed position is above the tooth 22 and remains projecting beyond it and outwards from it. There are however other possible layouts.

One foreseen but not restrictive use for the closure device is for fastening chains, for example for jewelry, costume jewelry trinkets and so on. One end of the chain is fixed to the achorage part 16, by inserting a ring part into the slot 20 for example; the other end of the chain, ending in a ring, is inserted in the hook part 18. Then the closing member is rotated so as to close the opening 21.

When the closing member is in the closed state and a force is applied to it directed to open it, on the connection part 28, the same can be considered as a lever, 13 being its fulcrum, the power being on 28 and the weight being at the engagement between the parts 29 on the body and 24 on the closing member. Therefore it is clear that, thanks to this combination, opening and closing require a certain effort. In particular, if a pulling action is applied to the two ends joined by means of the snap clasp, at first the hook resistance to tensile stress will resist the pulling action, and then, in the case where the tooth 22 is present, the pulling force is partly discharged onto the pin 13.

In FIGS. 5, 6 and 7 a modified embodiment 10a of the device is shown, in which the closing member 14a is pivoted on the body 12a at 13a, 13a being arranged substantially in correspondence with the closed side of the hook part 18a while the engagement projection 24a is provided substantially in correspondence with the open side of the hook at 21a. The straight line defined by 13 and 24 or by 13a and 24a, can be transverse to the longitudinal axis of the U-shaped part of the hook 18 or 18a, or also parallel to the said axis, or coinciding with it.

In this case also the closing member consists of two plates connected by a U, comprising arms 27a and a connection portion 28a which projects onto one side of the body 12a, when the device is in the closed state, while a closing part of the device closes the said opening 21a.

The device 10a, as far as the rest is concerned, is similar to the device 10 shown in FIGS. 1-4.

It should be noted that, although the closure device has been described as comprising two plates, it could however have only one, although this would be less advantageous. It could also consist of a shape with bars set at an angle to each other, U- or T-shaped for example, as it is sufficient for it to comprise a portion for closing the passage 21 or 21a, a portion for snap engaging the engaging member, and preferably a portion or part 27 or 27a. According to another embodiment, the closing member could be only one plate movable between the two walls of a slot housing in the body.

I claim:

1. A snap closure device comprising:

a plate-like body;

a closing member;

said body including a hook part forming an opening on one side, first snap closing means, and a pivot axis which is substantially orthogonal to the plate-like body;

the closing member being pivoted on said pivot axis of the body and rotatable on the same between an open position, in which the closing member leaves the opening of the hook part free, and a closed position, in which the closing member obstructs the opening of the hook part, and having a U portion which, in the closed position of the device, is positioned with arms of the U portion on both faces of the body and across the hook part; and the arms of said U portion presenting a second snap closing means for engaging first snap closing means of the body when the device is in the closed position;

the body comprising a tooth outwardly protruding from a free arm of the hook part, above which tooth a connecting part of said U portion of the closing member is placed while in the closed position.

2. A device according to claim 1, wherein said body further comprises an anchorage part.

3. A device according to claim 2, wherein said anchorage part comprises a slot.

4. A device according to claim 1, wherein said arms of the U are arranged in a slanting position with respect to a longitudinal axis of the device when in the closing position.

* * * * *